Figure 1:
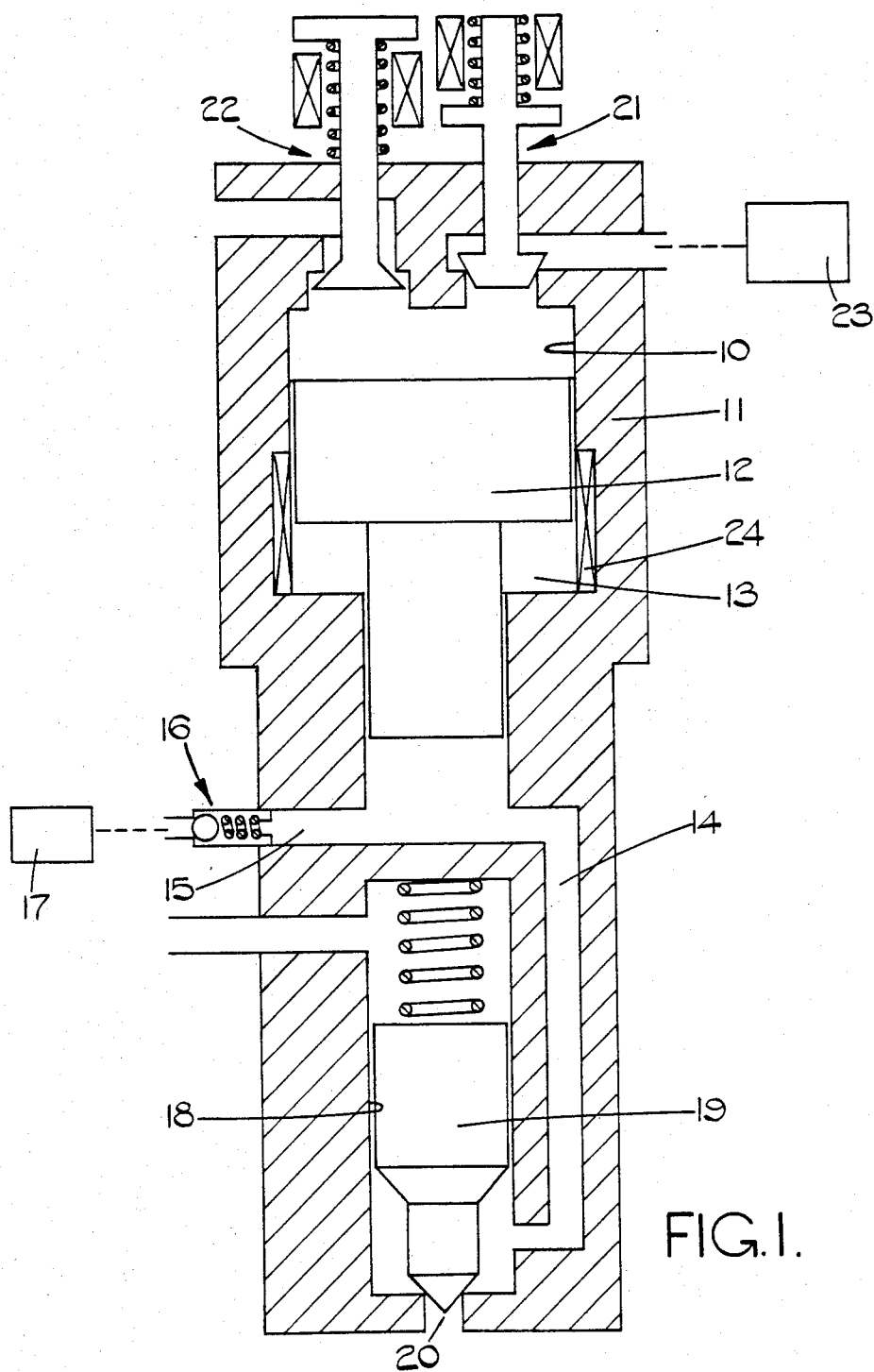

United States Patent [19]

Archer

[11] Patent Number: 4,519,351

[45] Date of Patent: May 28, 1985

[54] CONTROL SYSTEM FOR A FUEL SUPPLY SYSTEM

[75] Inventor: Michael A. Archer, Teddington, England

[73] Assignee: Lucas Industries, public limited company, Birmingham, England

[21] Appl. No.: 639,148

[22] Filed: Aug. 9, 1984

[30] Foreign Application Priority Data

Aug. 25, 1983 [GB] United Kingdom ............... 8322888

[51] Int. Cl.³ ............................................. F02D 31/00
[52] U.S. Cl. .................................... 123/357; 123/446; 123/458
[58] Field of Search ............... 123/446, 447, 357–359, 123/458

[56] References Cited

U.S. PATENT DOCUMENTS

| | | | |
|---|---|---|---|
| 3,516,395 | 6/1970 | Bassot et al. | 123/446 |
| 4,173,208 | 11/1979 | Fenne et al. | 123/447 |
| 4,325,340 | 4/1982 | O'Neill | 123/447 |
| 4,404,943 | 9/1983 | Seilly | 123/447 |
| 4,418,670 | 12/1983 | Lakin | 123/446 |
| 4,448,168 | 5/1984 | Komada et al. | 123/446 |

*Primary Examiner*—Magdalen Y. C. Moy

[57] ABSTRACT

A control system for a fuel supply pump of the kind having first and second valves to control the timing of fuel delivery and the quantity of fuel supplied includes a governor circuit for controlling the operation of the valves, a transducer which provides a signal representing the amount of displaceable fuel in the pump at the end of the filling stroke. The control system includes means for processing the signal provided by the transducer to take account of the engine speed so that the valve is open for the correct length of time.

3 Claims, 2 Drawing Figures

CONTROL SYSTEM FOR A FUEL SUPPLY SYSTEM

This invention relates to a control system for a fuel supply pump for an internal combustion engine, the pump being of the kind comprising a pumping piston reciprocable within a bore, an outlet for fuel at high pressure from one end of the bore, said outlet in use being connected to an injection nozzle of an associated engine, a first solenoid operable valve through which liquid under pressure can be admitted to the other end of the bore to cause displacement of said pumping piston towards said one end of the bore and delivery of fuel through said outlet, a second solenoid operated valve through which liquid can escape from said other end of the bore as a result of movement of said piston towards the other end of the bore under the action of furl under pressure admitted through a non-return valve to said one end of the bore and transducer means for providing an output signal representative of the position of said piston within the bore and the amount of displaceable fuel in the bore.

The output signal provided by the transducer is processed so that it represents the displaceable amount of fuel between the piston and the one end of the bore. In known systems this signal while the second valve is open and the first valve is closed, is compared with a demanded fuel signal and when the actual fuel signal is equal to or slightly greater than the demanded fuel signal, the second valve is closed to create an hydraulic lock in the other end of the bore thereby halting the movement of the piston. The operation of the second solenoid operated valve takes a finite time which means that an additional amount of fuel will flow into the one end of the bore, the volume of such additional fuel depending on a number of factors such for example as the fuel pressure and the closure time of the valve both of which can vary between individual pumps. This problem has been overcome in the past by calibrating ther pump at a particular fuel level usually the maximum fuel level. Unfortunately this method of calibration means that errors will exist at other fuel levels.

The object of the present invention is to provide a control system for a fuel pump of the kind specified in an improved form.

According to the invention a control system for a fuel supply pump of the kind specified comprises a governor circuit for controlling the operation of said first and second solenoid operated valves said governor circuit receiving an operator demand signal and engine position signals whereby the valves are operated in timed relation to the engine said governor circuit producing a desired fuel signal, comparator means for comparing the desired fuel signal and the output of said transducer means during the period of closure of both valves, said comparator means producing a switch enable signal in the event that the displaceable fuel in said bore is greater than the desired fuel, means including a switch for producing a speed signal the polarity of which depends upon the state of said switch, an integrator which receives said speed signal, a summing amplifier including a summing junction, the output of said integrator being supplied to said summing junction together with said desired fuel signal, the output of said summing amplifier being supplied through circuit means to said governor circuit.

An example of a control system in accordance with the invention will now be described with reference to the accompanying drawings in which:

FIG. 1 is a diagrammatic side elevation of a pump controlled by the control system, and FIG., 2 is a block diagram of the control system.

Referring to FIG. 1 of the drawings the fuel pump is of the type having an injection nozzle mounted in the same housing. The pump comprises a stepped bore 10 formed within a pump housing 11. Mounted in the bore 10 is a stepped pumping piston 12. The annular space 13 defined about the narrower portion of the piston and defined between the end of the wider portion of the piston and the step in the bore is in use connected to a drain.

Communicating with the narrower or one end of the bore is an outlet 14 and also a fuel inlet 15 which incorporates a non-return valve 16. The fuel inlet 15 is connected to a source 17 of fuel under pressure.

The outlet 14 extends to adjacent one end of a nozzle bore 18 in which is slidably mounted a spring loaded valve member 19. The valve member 19 controls the flow of fuel through an outlet orifice 20 and in the usual manner has a portion of reduced diameter to define an annular area against which fuel under pressure can act to move the valve member 19 against the action of its spring thereby to allow fuel flow through the outlet orifice 20. The chamber which contains the spring biasing the valve member 19 to the closed position, is connected to a drain.

The wider end of the bore 13 can be connected by way of solenoid operated valves 21, 22 respectively to a source 23 of liquid at high pressure or a drain. The liquid may in fact be fuel and when the valve 21 is open and the valve 22 closed, the piston 12 will be moved by the liquid under pressure to displace fuel at high pressure through the outlet 14 to the injection nozzle. The pressure of fuel developed will of course be higher than the pressure of liquid in view of the intensification of pressure provided by the stepped piston. The movement of the piston under the action of liquid under pressure may be terminated by its abutment with the step in the bore and if when the piston is in contact with the step, the valve 21 is closed and the valve 22 opened, fuel under pressure from the source 17 will flow into the narrower end of the bore to move the piston 12 in the opposite direction displacing in the process, liquid to drain. Movement of the piston can be halted by closure of the valve 22 which will create an hydraulic lock. From this position if the valve 21 is opened a fresh quantity of fuel is delivered to the associated engine. The volume of fuel which is delivered during the movement of the piston towards the narrower end of the bore, is determined by the final position adopted by the piston during its movement towards the wider end of the bore. A signal representing the position of the piston within the bore is provided by a transducer 24.

Figure 2:
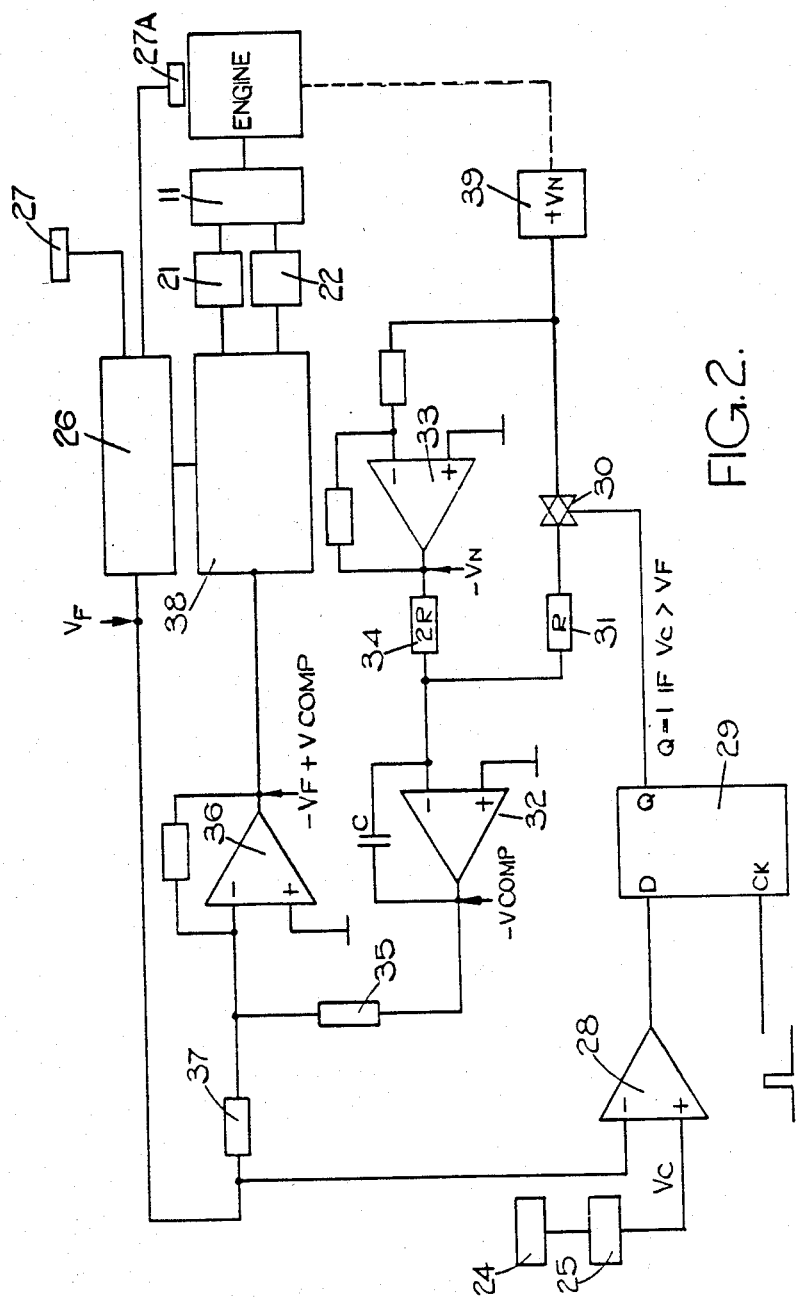

Turning now to FIG. 2 of the drawings the signal provided by the transducer 24 is processed in a circuit 25 the output signal VC of which is proportional to the fuel displaceable by the piston 12. The supply of electric current to the solenoids of the valves 21, 22 is effected by means of governor circuit generally shown at 26 and to which is supplied an operator demand signal by means of a transducer 27. The circuit 26 is responsive to various engine operating parameters such for example as speed, and acts as a governor circuit producing a signal VF which is a voltage signal proportional to the amount of fuel which it is required to supply to the associated engine at each working stroke of the pump. The circuit 26 also receives engine position signals from a transducer 27A so that it can determine exactly the instant at which the valve 21 should be opened to effect delivery of fuel to the engine. In known forms of control circuit the signals VC and VF are compared and when the signal VC representing the displaceable fuel, is equal to or slightly greater than the signal VF, the valve 22 is closed to halt the return motion of the piston 12. As previously mentioned however a finite time is required for the valve 22 to close which leads to difficulty in obtaining the correct amount of fuel. The two signals in the present circuit are therefore used in a slightly different way. The signals VF and VC are compared in a comparator 28 and the output of the comparator is applied to the "D" input of a D-type latch 29. The latch 29 is supplied with a clock pulse at its clock input, which latches the output of the comparator 28 to the Q output of the latch. The clock pulse is arranged to occur at a point in the cycle after the valve 22 has been closed but before the valve 21 is open. The output at the Q terminal of the latch will therefore be equal to one if VC is greater than VF. If VF is greater than VC the output will be zero.

The output of the latch is utilised in a switch 30 one input of which is connected to receive a voltage VN generated by a speed transducer 39, which is proportional to the speed of the associated engine. When the switch 30 is closed the voltage VN is applied by way of a resistor 31 to the input of an integrator 32. The speed signal VN is also supplied to the input of the integrator by way of an inverter 33 the output of which is connected to the input of the integrator by way of a resistor 34 which has twice the resistance value of the resistor 31.

The output of the integrator is passed by way of a resistor 35, to the summing juction of a summing amplifier 36. The summing juction also receives the signal VF by way of a resistor 37 and the output of the summing amplifier is connected to a circuit 38 which generates a voltage representative of the filling time i.e. the time during which the valve 22 should be open, and effects operation of the valves 21, 22.

In operation, the signal VN applied by way of the inverter to the integrator, will draw a current equal to VN/2R out of the integrator. This will cause the output of the integrator to ramp positive unless the output of the latch circuit 29 is high in which case the output of the integrator will ramp negative because of the current VN/R which flows into the integrator through the switch 30. The signal VF and the output signal from the integrator are summed at the summing junction and the output of the summing amplifier is a voltage which is equal in magnitude to the voltage VF plus or minus the output voltage of the integrator. In practice the output voltage of the amplifier 36 "hunts" above and below the voltage required to make VC=VE but the overall effect is to maintain the voltage VC equal to the voltage VF. The output of the summing amplifier is in effect a d.c. level with a small ripple but the effect of the ripple is minimised by feeding the integrator with the engine speed signal. The ripple amplitude is the product of the slew rate of the integrator 32 (VN/2RC) and the time between injections (k/VN) where k is a constant. Hence the amplitude of the ripple is represented by k/2RC which is a constant independent of speed. In the event that the transducer 24 becomes defective a "limp home" facility is available using the voltage VF above to determine the filling time.

I claim:

1. A control system for a fuel supply pump for an internal combustion engine, the pump being of the kind comprising a pumping piston reciprocable within a bore, an outlet for fuel at high pressure from one end of the bore, said outlet in use being connected to an injection nozzle of an associated engine, a first solenoid operable valve through which liquid under pressure can be admitted to the other end of the bore to cause displacement of said pumping piston towards said one end of the bore and delivery of fuel through said outlet, a second solenoid operated valve through which liquid can escape from said other end of the bore as a result of movement of said piston towards the other end of the bore under the action of fuel under pressure admitted through a non-return valve to said one end of the bore and transducer means for providing an output signal representative of the position of said piston within the bore and the amount of displaceable fuel in the bore comprising a governor circuit for controlling the operation of said first and second solenoid operated valves said governor circuit receiving an operator demand signal and engine position signals whereby the valves are operated in timed relation to the engine said governor circuit producing a desired fuel signal, comparator means for comparing the desired fuel signal and the output of said transducer means during the period of closure of both valves, said comparator means producing a switch enable signal in the event that the displaceable fuel in said bore is greater than the desired fuel, means including a switch for producing a speed signal the polarity of which depends upon the state of said switch, an integrator which receives said speed signal, a summing amplifier including a summing junction, the output of said integrator being supplied to said summing junction together with said desired fuel signal, the output of said summing amplifier being supplied through circuit means to said governor circuit.

2. A control system according to claim 1 in which said means for producing the speed signal comprises a speed transducer which generates a voltage signal representative of the engine speed, a first resistor through which said voltage signal is applied to the input of the integrator by way of said switch, an inverter for inverting said voltage signal and a second resistor through which the inverted signal is supplied to the input of the integrator.

3. A control system according to claim 1 or claim 2 of said comparator means comprises a comparator for comparing the output of said transducer means and the desired fuel signal and a D-type latch, the clock input of said latch being supplied with a clock pulse at a point in the cycle when both valves are closed.

* * * * *